US006175870B1

United States Patent
Gawlick et al.

(10) Patent No.: US 6,175,870 B1
(45) Date of Patent: Jan. 16, 2001

(54) METHOD OF ADMISSION CONTROL AND ROUTING OF VIRTUAL CIRCUITS

(75) Inventors: Rainer Gawlick, Washington, DC (US); Anil P. Kamath, Berkeley Heights, NJ (US); Serge Plotkin, Menlo Park, CA (US); Kajamalai Gopalaswamy Ramakrishnan, Berkeley Heights, NJ (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 08/565,737

(22) Filed: Nov. 30, 1995

(51) Int. Cl.[7] .............................. G06F 15/173; H04J 3/26
(52) U.S. Cl. ..................... 709/227; 709/238; 370/351; 370/408; 370/409; 379/219
(58) Field of Search ............................ 395/200.15, 200.1; 709/200, 227, 238; 370/351, 408, 409; 379/219, 901; 710/100

(56) References Cited

U.S. PATENT DOCUMENTS

| 5,274,643 | * | 12/1993 | Fisk ...................................... 370/94.1 |
| 5,502,816 | * | 3/1996 | Gawlick et al. .................. 395/200.15 |
| 5,519,836 | * | 5/1996 | Gawlick et al. .................. 395/200.15 |

FOREIGN PATENT DOCUMENTS

| 0660569 | 6/1995 | (EP) . |
| 0674459A | 9/1995 | (EP) . |

* cited by examiner

Primary Examiner—Tuan V. Thai
(74) Attorney, Agent, or Firm—Martin I. Finston; Katharyn E. Olson (57) ABSTRACT

A method of admitting and routing switched virtual circuit requests in a network first finds a set of routing paths on which a requested VC may be routed by using a two step process. The method uses a cost function based on a parameter related to the number of hops in a subset of VC connections previously made in the network to determine potential routing paths on which the VC can be routed at a cost below a specified threshold. The method next checks to determine which potential routing paths comprise links and nodes with sufficient resources to accommodate the request. Paths satisfying both steps are output as a set of routing paths and then a second criterion is used to select a path from the set on which to route the request. In a distributed routing system, the inventive method uses a local network state to determine the cost function and the set of routing paths. The method further updates local state information at nodes along a path selected from the set and permits other paths from the set to be selected for routing a requested VC if the previously selected path has insufficient resources to accommodate the request.

24 Claims, 5 Drawing Sheets

METHOD OF ADMISSION CONTROL AND ROUTING OF VIRTUAL CIRCUITS

TECHNICAL FIELD

The invention relates to the admission control and routing of virtual circuits.

BACKGROUND OF THE INVENTION

A network is one means for exchanging or transferring information (e.g., signals representing data, voice, text, video) among endpoints (e.g., host machines, fax machines or terminals) connected to the network. The network comprises nodes connected, to each other and to the endpoints, by links. Typically, each link is bidirectional, (i.e., information may be conveyed in the forward and reverse directions) and each link is characterized by parameters, such as a bandwidth or capacity in each direction. The nodes advantageously comprise buffers. If a link does not have sufficient capacity to handle information received at a node, a buffer in the node may be used to store the received information until such time as the link has sufficient capacity.

Networks are increasingly being used for the reliable, high-speed transmission of information in digital format between endpoints over wide areas. This increased use is bringing major changes to network services and architecture/infrastructure design. In particular, a wide spectrum of new consumer services, such as video-on-demand and video teleconferencing, are expected to be offered on Broadband Integrated Services Digital Networks (BISDN). The principal technique for transmission in BISDN is called Asynchronous Transfer Mode (ATM). See, S. E. Minzer, "Broadband ISDN and Asynchronous Transfer Mode," *IEEE Comm. Mag.*, pp. 17–24, September 1989.

When information is to be exchanged between two endpoints (an initiating endpoint and a destination endpoint), the initiating endpoint requests that a bidirectional path (i.e., a connection comprising nodes and links) be established in the network between the two endpoints. In an ATM network, the path that is established is a so-called "virtual circuit" (VC), by which it is meant that the endpoint initiating the exchange simply specifies the destination endpoint, and the network delivers the information from the initiating endpoint to the destination endpoint as though they are connected by a direct circuit. The number of "hops" in the path of the VC is equal to the number of links in the path or to one less than the number of nodes in the path.

An important consideration in the operation of a network is whether to admit new VCs onto the network and how to route admitted VCs through the network. In determining whether to admit and how to route requests for VCs from these endpoints, a network admission and routing scheme must reserve resources (e.g., bandwidth on the links comprising the VC). Resource reservation is necessary so as to satisfy any quality-of-service (QOS) guarantees provided by the network, e.g., requirements relating to a maximum information loss rate or maximum delay in receiving information. Resource reservation, in turn, implies the need for admission control to ensure that resources are not reserved on the links and in the nodes in excess of resources that are available.

Generally, the objective of routing and admission control methods is to maximize utilization of the network resources without violating resource constraints and while satisfying any QOS guarantees or requirements. Many factors complicate routing and admission control decisions. First, the decisions may have to be made "on-line," i.e., without knowledge of what effect future routing demands will have on network resources. Although this problem may be solved by so-called "dynamic-rerouting" techniques, these techniques typically adversely affect the quality of service offered to users of the network. Second, the current state of the network (i.e., the network topology and current allocation of network resources) may not be available such as when information about recently allocated resources has not yet been reflected in the network state. In such as case, the routing and admission decision may be based on static or inaccurate state information. Third, the admission and routing decisions must often be made in real time, i.e., within a time interval determined by the VC set up protocol which specifies the amount of time allotted for attempting to establish or set up a VC and which specifies how many attempts to set up a VC are permitted.

Admission control and routing methods typically admit and route requested VCs on selected paths so as to minimize some cost function that reflects the amount of network resources required by the selected path. Although a variety of cost functions can be used, cost functions typically are functions of parameters relating to the current network state, delay through the network.

The manner in which the admission and routing problem for requested virtual circuits is addressed typically is based on factors such as whether the routing is done with incomplete or complete information and on whether the VCs are permanent or switched. In particular, such factors are typically useful in specifying the parameters of the cost function. Routing with incomplete information means simply that the state of the network is not known or, if the state is known, that the state information is dated, e.g., that the available state information does not incorporate information regarding network resources allocated to the most recently routed VCs. Conversely, routing with complete information means that the state information is fully known and that the state information is up-to-date. Large scale networks (e.g., networks comprising on the order of a hundred nodes over a geographic area the size of the United States) cannot expect to have accurate or complete state information available at every node connected to an originating endpoint due to propagation delays in relaying information from node to node. As a consequence, such networks must either make all routing decisions based on complete information at a centralized site (which site has access to all nodes) or the network must make routing decisions locally (i.e., in a distributed manner) based on static or inaccurate state information. Permanent VCs are paths for information transfer between endpoints designed to operate and remain established for long periods of time, perhaps on the order of years. Switched VCs are designed to operate for hours or days.

One admission scheme that has been suggested for permanent VCs and for switched VCs (where the switched VCs are to be established for known durations of time) uses an exponential function of link load to evaluate the cost of routing information on any given path in the network. See, B. Awerbuch et al., "Throughput-Competitive On-Line Routing" *34th Annual Symp. on Foundations of Comp. Sci.*, Palo Alto, Calif., November 1993. The exponential cost based algorithm of Awerbuch et al., supra, is referred to herein as the "AAP" method.

The AAP method is based on a threshold cost which is determined as a function of an admission threshold and an exponential cost metric for each link in the network. The AAP method, for a requested VC, determines a set of paths on which the requested VC may be routed where the cost of routing on the links in any given path in the set of paths is below the threshold cost. Any request whose cost of routing through the network is above the threshold cost is rejected. The AAP method, however, has several shortcomings. First, the AAP method does not specify which particular path in the set of paths should be used to route the requested VC (i.e., the AAP method performs admission control only and does not select particular paths for or route requested VCs). Moreover, Awerbuch et al. do not indicate how to apply the AAP method in the case of switched VCs which are to be established for unknown durations of time. Other aspects of the AAP method, and in particular the exponential cost function of the AAP method, are examined in the following paragraphs.

Pseudo-code which implements a portion of the AAP exponential-cost based method is shown in Table 1. Each line of the pseudo-code of Table 1 is explained below. Let n denote the number of nodes in the network. The capacity u(e) assigned to each link e in the network represents bandwidth available on that link. Upon receiving a $j^{th}$ request from an origination endpoint for a VC to a destination endpoint (line 1 of the pseudo-code), the request represented by $(s_j, t_j, r_j, T_j^s, T_j^f)$, the AAP method attempts to allocate a route or path of capacity $r_j$ from originating node $s_j$ (directly connected to the origination endpoint) to the destination node $t_j$ (connected directly to the destination endpoint) starting at time $T_j^s$ and ending at time $T_j^f$. For simplicity, assume that the routing is done at time $T_j^s$.

The goal of the AAP method is to maximize the throughput of the network, i.e., the amount of information being carried through the network over a time interval. Let $T_j = T_j^f - T_j^s$ denote the holding time or duration of the circuit, T denote the maximum possible $T_j$, and r denote the maximum request bandwidth (rate) $r_j$. Let the threshold cost for the AAP method be the product of n, r and T.

TABLE 1

(1) ROUTE $(s_j, t_j, T_j^s, T_j^f, r_j)$:
(2) $\forall \tau, e \in E: c_e(\tau, j) \leftarrow u(e)(\mu^{\lambda_e(\tau, j)} - 1);^*$
(3) if $\exists$ path P in G(V,E) from $s_j$ to $r_j$ s.t.

(4) $\sum_e \sum_\tau \frac{r_j}{u(e)} c_e(\tau, j) \leq nrT$ (5) then route the requested circuit on P, and set:
(6) $\forall e \in P, T_j^s \leq \tau \leq T_j^f,$ (7) $\lambda_e(\tau, j+1) \leftarrow \lambda_e(\tau, j) + \frac{r_j}{u(e)}$ (8) else reject the connection In the AAP method the routing decision is based on the information about the current load (demand) and on the future demand for resources on the links (or edges) of the network, i.e., the routing decision takes into account the demand for requests for VCs that may be routed during the holding time of the $j^{th}$ VC. The load is measured relative to the edge capacity u(e). Let $P_i$ denote the route used to satisfy the ith request. The load on edge e at time $\tau$ as seen by the routing method when routing the jth circuit is defined as follows:

$$\lambda_e(\tau, j) = \sum_{\substack{e \in P_i, i < j \\ \tau \in [T_i^s, T_i^f]}} \frac{r_i}{u(e)}. \quad (1)$$

Equation (1) indicates congestion or load on link e at time $\tau$ due to other requests routed on link e. After computing the load, the next step is to compute the exponential cost as in line 2 of Table 1. In the AAP method the cost of edge e at time $\tau$, $c_e(\tau, j)$, when routing the $j^{th}$ circuit is defined by $$(2) c_e(\tau, j) = u(e)(\mu^{\lambda_e(\tau, j)} - 1),$$

where $\lambda_e$ is the load on link e (i.e. the percentage of link capacity being utilized) at time $\tau$ while attempting to route the $j^{th}$ VC, u(e) is the capacity of link e and $\mu$ is a parameter. The parameter $\mu$ is related to: n, the number of nodes in the network, r, the maximum possible value of $r_j$; and T, the maximum possible value of $T_j$. If a set of paths exist for which the cost of routing the requested VC on any path in the set is below the threshold, the request is accepted (lines 3–5). In lines 6–7 of Table 1 the resources required by the routed request are reflected in an updated network state. If the set of paths is the empty set, the request is rejected.

Awerbuch et al. suggests selecting $\mu$ to be $2nTr/(r_{min}+1)$ (where $r_{min}$ is the smallest bandwidth than any VC will request). The value of $\mu$ may be on the order of 100,000 for a moderately sized network. Proper selection of high values for the parameter $\mu$ guarantees routing of a total number of requests for VCs within a factor (on the order of $\log \mu$) of the number of requests that can be routed by an optimal, off-line routing scheme, i.e., a scheme that has information about all requests in advance.

Although the AAP method guarantees sufficient resources for routing admitted VC requests, the method has a further shortcoming in that it is overly conservative in admitting VCs and thus does not fully utilize network resources. However, simply reducing the value of $\mu$ causes the AAP method to accept requests in excess of available network resources which is not advantageous since it may mean that the network will not be able to satisfy QOS requirements guaranteed to network users. Additionally, the AAP method requires knowledge of link loads at both current and future times. This knowledge may not be available, may be based on dated information or may require an excessive amount of memory to store.

Thus, there is a need for an improved method for routing and admission control of VCs that will increase utilization of network resources while satisfying QOS requirements which method may also be used in networks of switched VCs where the duration or holding time of the VCs is unknown.

SUMMARY OF THE INVENTION

In accordance with the present invention it is recognized that the cost of routing a requested virtual circuit on links in a path through a network comprising a set of links may be determined based on parameter related to the number of hops in a subset of the set of all virtual circuits previously established in the network. The inventive method determines the cost for routing a requested virtual circuit on a path through a network by receiving a request to route a virtual circuit on a path between an origination and destination node, determining the load on each link in a subset of the set of links in the network, and determining a respective cost for routing the request over possible paths in the network between the origination and destination nodes, wherein the possible paths comprise links in the subset of the set of links and wherein the cost is a function of a network state and a parameter related to the number of hops for the subset of the set of all virtual circuits previously routed through the network. A path is then selected from among those paths having both 1) costs below a threshold and 2) links with sufficient capacity to accommodate the request. The inventive method may be used in either centralized or distributed systems and may be used to route either permanent or switched virtual circuits of known or unknown holding times.

BRIEF DESCRIPTION OF THE DRAWINGS

Other features and advantages of the invention will become apparent from the following detailed description taken together with the drawings in which.

DETAILED DESCRIPTION

Figure 1:
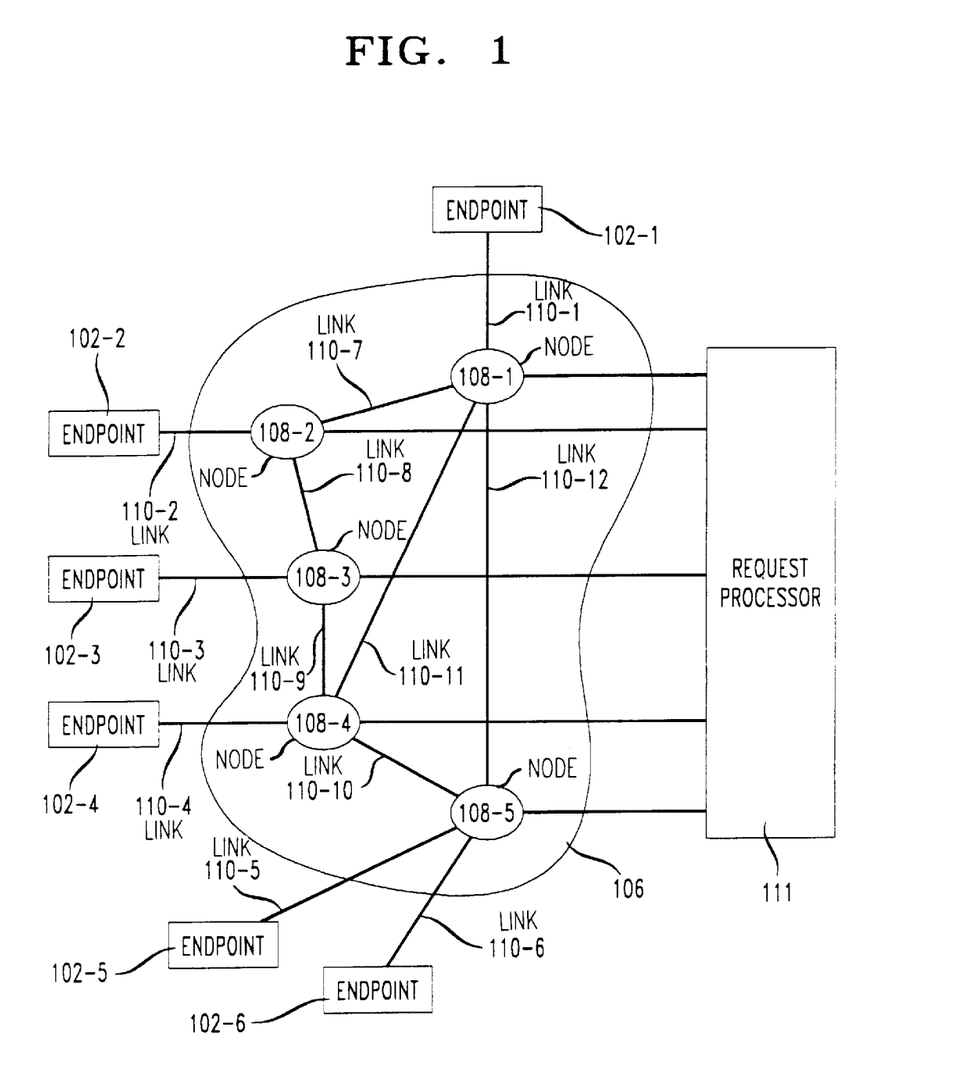
FIG. 1 illustrates a centralized routing network in which the invention may be practiced.

FIG. 1 illustrates the structure of network 106 in which the invention may be practiced. Endpoints 102-$i$, $i$=1,2, . . . , exchange information via network 106. Network 106 comprises links 110-$k$, $k$=1,2, . . . , connecting nodes 108-$j$, $j$=1,2, . . . , to each other and to endpoints 102-$i$. A pair of nodes may be connected by one or more links.

Network 106 in FIG. 1 is a centralized routing system in that network 106 utilizes complete information for routing through use of centralized routing request processor 111. Request processor 111 is connected to nodes 108-$j$. Since all requests for VCs are processed in request processor 111, request processor 111 has complete knowledge of the network state, e.g., request processor determines the utilization of the capacity of each link and the amount of buffer space available in buffers in each node in the network. Thus, the cost for any path (i.e., the additional network resources required for any path) through the network can be accurately determined.

Figure 2:
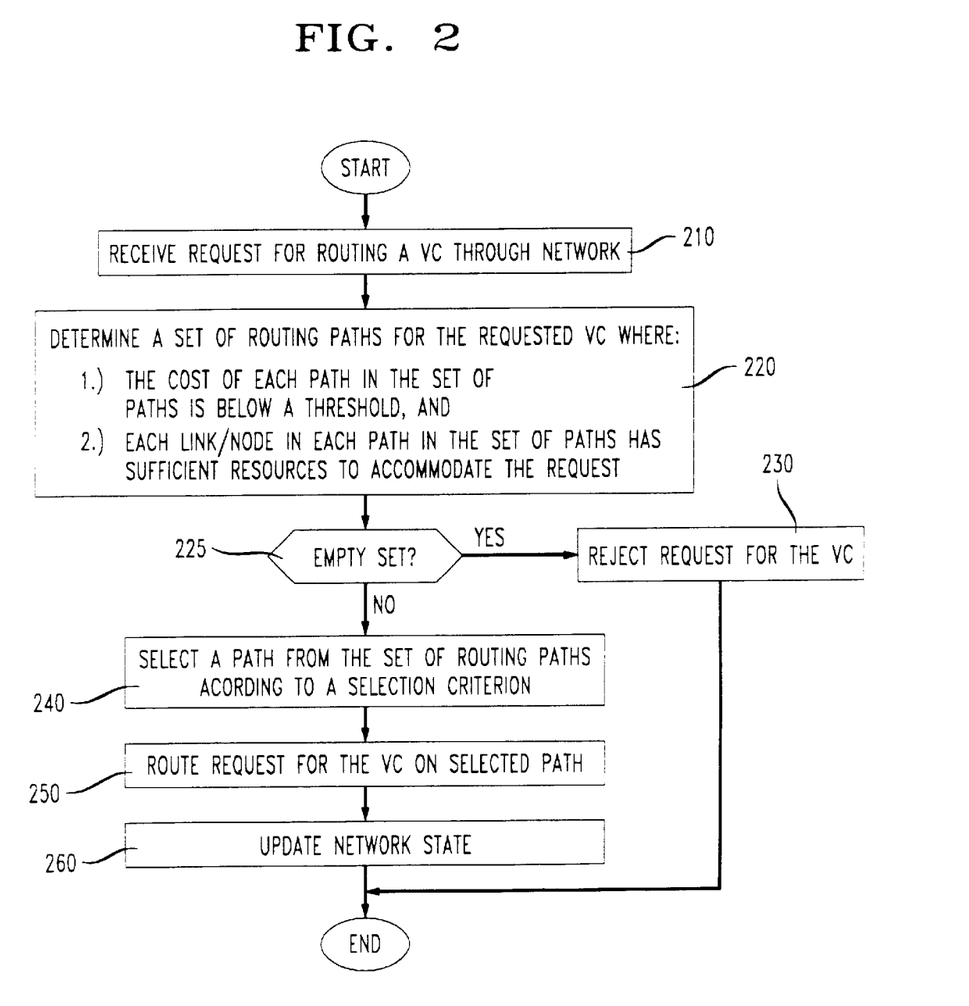
FIG. 2 is a flowchart of steps in the inventive method used in the network of FIG. 1.

FIG. 2 illustrates steps in the inventive method for routing VCs through a network which method may advantageously be used by request processor 111. In step 210 a request (identified as the $j^{th}$ request) for a VC is received from an originating endpoint. The request typically comprises parameters specifying an origination node ($s_j$), a destination node ($t_j$), a requested bandwidth ($r_j$), a starting time for the VC ($T_j^s$) and an ending time for the VC ($T_j^f$). The request is specified as ($s_j, t_j, r_j, T_j^s, T_j^f$). Step 220 describes the inventive method for determining a set of paths on which the requested VC may be routed. As noted in step 220, the set of paths is determined according to a first criteria, i.e.,, so that the cost of each path in the set of paths is below a threshold and so that each of the links and nodes in each path in the set of paths has sufficient available resources to accommodate the request.

Figure 3:
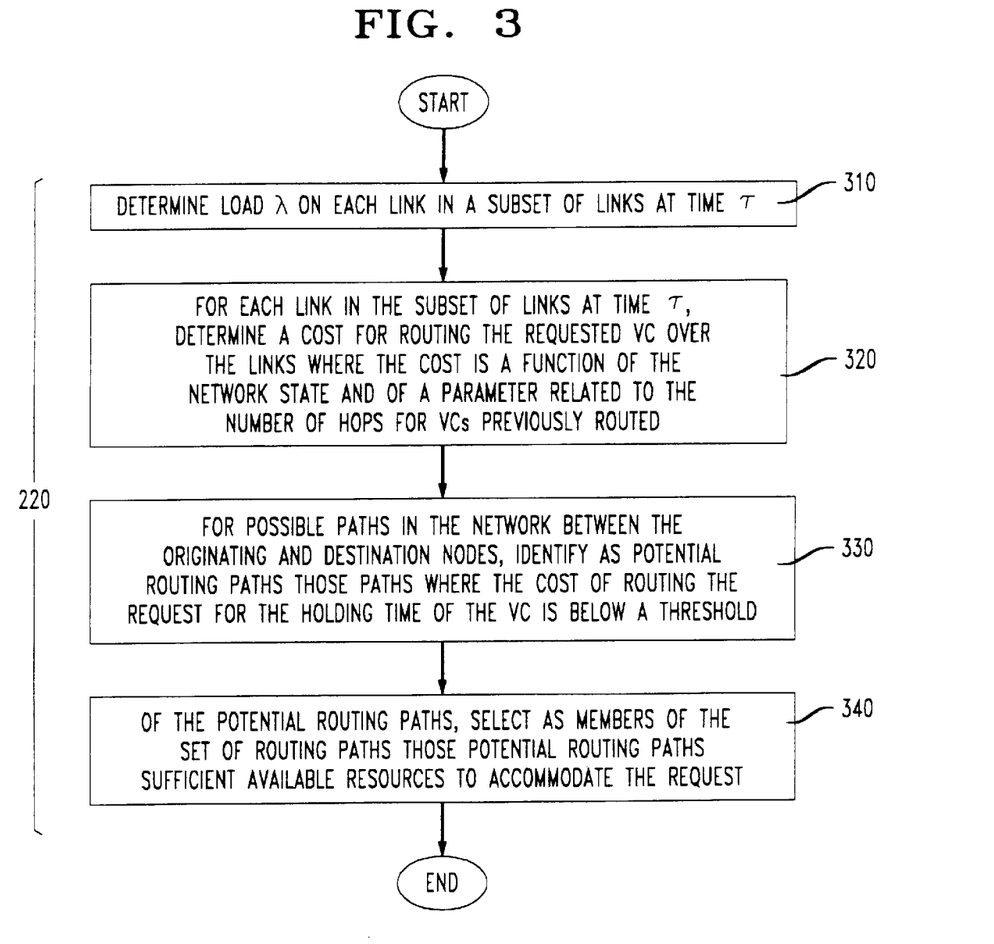
FIG. 3 is a flowchart of steps in the inventive method for determining a set of paths on which a requested VC may be routed.

FIG. 3 illustrates step 220 in further detail. In step 310, the load $\lambda$ on each link e in network 106 at time $\tau (T_j^s \leq \tau \leq T_j^f)$ is determined advantageously using equation (1), supra. In step 320 the cost for routing the $j^{th}$ request over each link e in the network at time $\tau$ is determined according to a modified cost function, $c'_e(\tau,j)$, (3) $\forall \tau, e \in E$: if$(\lambda_e(\tau,j)+r_j/u(e)) \geq 1$ then $c'_e(\tau,j) \leftarrow \infty$ else $c'_e(\tau,j) \leftarrow c_e(\tau,j)$ where $C_e(\tau,j)$ is advantageously determined using equation (2), supra. In equation (2) the method checks to determine if the capacity of link e will be exceeded if the $j^{th}$ request is routed through that link. If the capacity is exceeded, the cost is set to a very high number so that the method will not select a path, comprising this link, as a path on which to route the request. If the capacity on link e is not exceeded, the cost function is computed, advantageously using equation (2). The cost function in the inventive method is, as in the AAP method, advantageously a nonlinear function designed to trade-off admission to a network based on paths comprising a large number of lightly or moderately utilized links versus a small number of relatively heavily used links. However, as described below, the parameter $\mu$ used in determining $c_e(\tau,j)$ in the inventive method is selected based on parameters different than in the AAP method. In step 330, possible paths between the originating and destination nodes in the network, a set of paths where the cost of routing the request during the holding time of the requested VC is below a threshold are identified. These paths are termed potential routing paths. In step 340, links in each respective potential routing path are checked to ensure that the links have sufficient available capacity to accommodate the requested VC (i.e., to ensure that the link is not "saturated"). Those potential routing paths with links having sufficient capacity for the duration of the holding time of the requested VC from the set of routing paths in step 220.

Note that procedure in step 220 may be accomplished by varying the order of the steps in FIG. 3. For example, if the load the links is determined first, the method may then eliminate from consideration those links with insufficient capacity to handle the request. Then, based on the remaining links, potential paths between the origination and destination nodes can be determined and the cost of routing over the potential paths may then be determined. Those potential paths of sufficiently low cost will then form the set of routing paths.

Returning to FIG. 2, in step 225 the set of routing paths is examined. If the set of routing paths determined in step 220 is an empty set, the request is rejected in step 230. Alternatively, if the set of routing paths is not empty, a path on which the requested VC will be routed is selected in step 240 from the set of routing paths according to a selection criterion.

The selection criterion in step 240 is advantageously chosen to be the minimum hop path, i.e. the path passing through the smallest number of nodes. Those skilled in the art will recognize that other criteria may be used, e.g., the criterion may be to select the path with the lowest cost.

In step 250 the requested VC is routed on the selected path. In step 260 request processor 111 updates the network state to reflect use of network resources by the routed VC.

Although the inventive method is related to the exponential cost based algorithm of Awerbuch et al., supra, the inventive method improves the AAP method in several ways. First, the inventive method uses different parameters to determine the value of $\mu$ to be used in equation (2). Specifically, the parameter $\mu$ is a function of the number of hops (i.e., the number of links in a path) for a subset of the set of all VCs previously routed through the network. Generally, $\mu$ is advantageously chosen to be a function of L where L is the average number of hops or links in a subset of the set of all VCs previously routed through the network. For example, one selection is where log $\mu$ is a function of L, such as log $\mu$ is on the order of log L. Typically, $\mu$ is approximately between 2 and 4. Thus, the value of $\mu$ is typically reduced from its value according to the AAP method. A reduced value of $\mu$ in turn leads the inventive method typically to generate a large set of potential routing paths on which a requested VC may be routed. Thus, the inventive method is not overly conservative in generating a set of potential routing paths. However, the inventive method, by being less conservative, may include in the set of potential routing paths some paths comprising links with insufficient capacity to handle the request. Consequently, the inventive method, unlike the AAP method, selects from the set of potential routing paths only those paths with links having sufficient capacity to accommodate the request. Those paths then comprise the set of routing paths in step 220 of FIG. 2. Additionally, the inventive method, unlike the AAP method, advantageously uses a selection criterion to select a path on which to route the request. Thus, the inventive method finds a set of routing paths meeting an initial criterion, e.g., where each path in the set of routing paths could route the requested VC at a cost below a certain cost threshold. The method then advantageously selects one path from the set based on a selection criterion. e.g., the minimum hop path. Observe that the inventive method produces legal routing decisions (i.e., there will be sufficient capacity to accommodate the request) for any value of $\mu$t. The inventive method thus, unlike the AAP method, performs both the tasks of admission control and routing.

Finally, it should be observed that the inventive method may be used in cases where the duration or holding time of a requested VC is not known. For example, the inventive method, in both centralized and distributed networks, advantageously assumes that the duration of the virtual circuit is known in advance. While this is a reasonable assumption for many applications, e.g., movies, there are a large class of application, e.g., phone calls, for which this is not a reasonable assumption. However, statistical descriptions of the duration are available for many applications for which the duration is not known in advance. Telephone calls are a good example, and the statistical duration information about the phone calls to be carried by requested virtual circuits can be used to make routing and admission control decisions. Similarly, the inventive method may be used to route permanent VCs by setting the parameter $T_j^f$ in the request for the VC to a large number or by removing the time summation in the code of Table 1.

The inventive method may also be used in systems in which local (decentralized) routing decisions, rather than centralized routing decisions, are made. Several considerations motivate use of a decentralized system. First, a centralized routing scheme is more likely to suffer from reliability problems than a decentralized system since centralized routing system has a single point of failure (i.e., the request processor). Second, centralized routing systems typically have difficulty operating or communicating with other centralized routing systems since each of the systems typically will not have information about the state of the other system. Thus, addition protocols for arbitrating and communicating between centralized networks are required. Finally, since each node in a centralized routing system must first communicate with a device (such as request processor 111 of FIG. 1), the propagation delay for communicating with such a device increases the set up time for establishing a VC beyond the set up time typically required in distributed systems.

Figure 4:
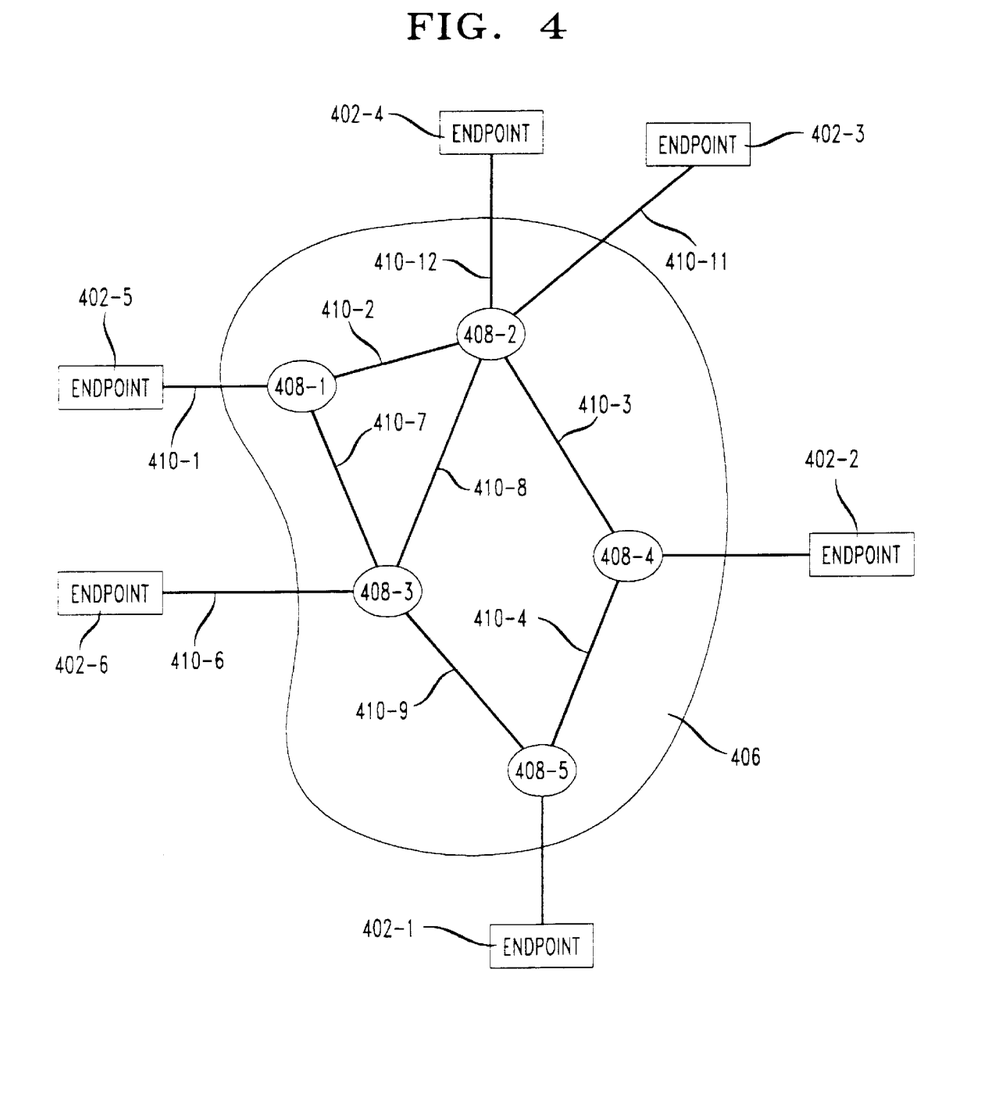
FIG. 4 illustrates a distributed routing network in which the invention may be practiced.

FIG. 4 illustrates the structure of a distributed network 416, comprising nodes 418-$m$ and links 420-$n$, in which the inventive method may be practiced. Network 416 is a distributed routing system in that each node 418-$m$ periodically exchanges state information with neighboring nodes. The state information reflects the amount of network resources available or in use on a link from a node to every neighboring node. Thus, the cost for any path through the network can be determined by a node. However, unless the state information propagates quickly relative to the speed with which VCs are established and torn down, the information will be incomplete (e.g., dated). Thus, each node may have a different description or local view of the network state. This description is called the local network state.

Figure 5:
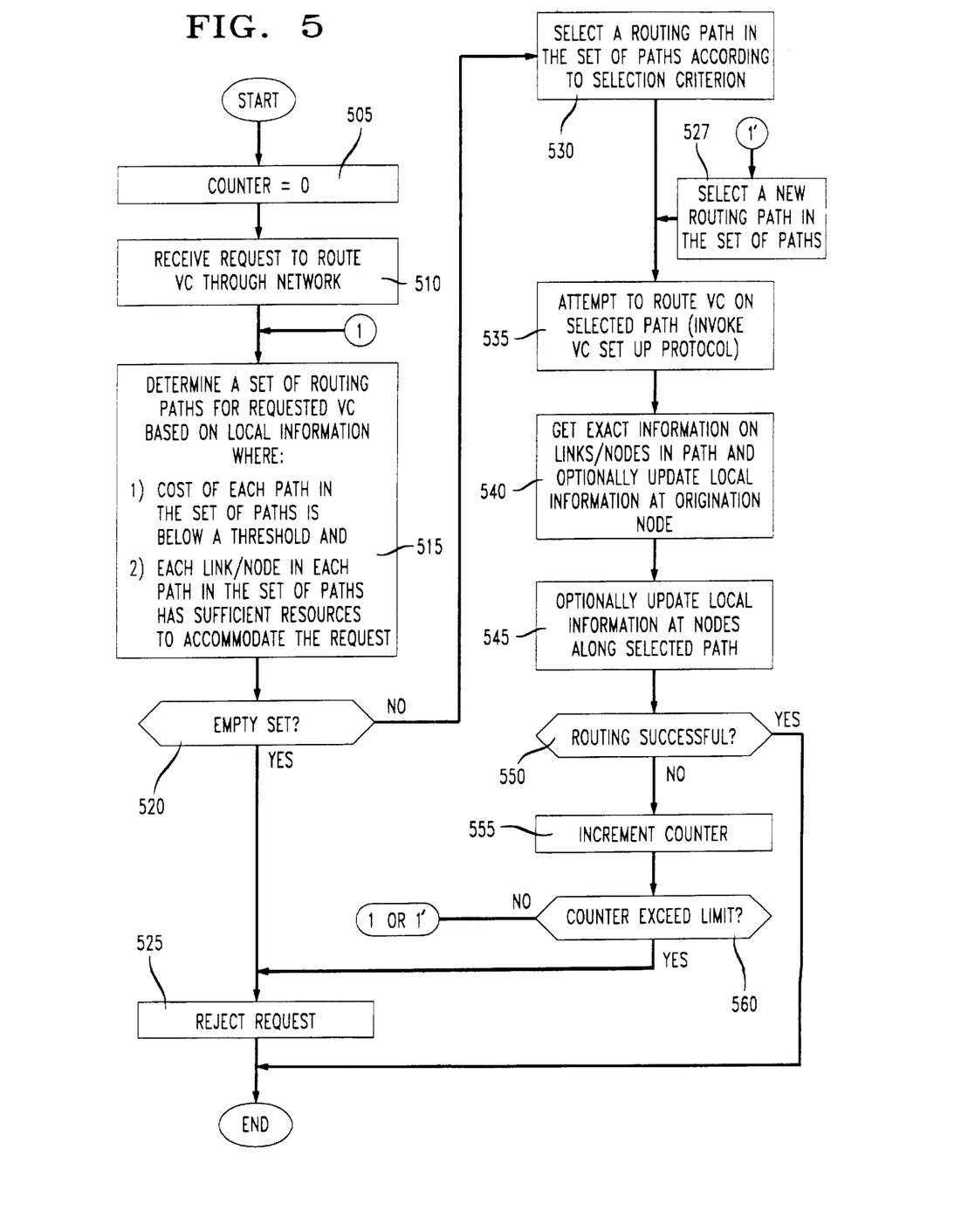
FIG. 5 is a flowchart of steps in the inventive method used in the network of FIG. 4.

FIG. 5 illustrates a flow chart for using the inventive method in a distributed routing system where incomplete state information is used. In the system and method of FIGS. 4 and 5, each node maintains a local view of the network state. That view is constructed from the state of the links connected to each node and from information about other links gathered during VC setup as described below. When a virtual circuit request arrives, the inventive method is invoked. Based on local information, the inventive method either rejects the request, or it selects a path, in which case an attempt is made to use the selected path to route the circuit. As the request is attempted to be routed, the inventive method advantageously collects state information for links and nodes along the selected path. This collected state information is accurate with respect to the resources used at each node and link along the path. Thus, the state information gathered can be used to update the local network state at the origination node. The state information can advantageously be incorporated into signaling messages used during a VC set up thereby reducing overhead.

Turning now to FIG. 5, in step 505 a counter, which is used to limit the number of attempts to route a request, is initialized, for example, to zero. In step 510 a request for a VC is advantageously received at an origination node from an originating endpoint in the network of FIG. 4. The request, as before, may be specified as $(s_j, t_j, r_j, T_j^s, T_j^f)$, with the request parameters defined as above. In step 515 the inventive method is used to determine a set of routing paths on which the requested VC may be routed. The operation of step 515 is similar to the operation of step 220 in FIG. 2 except that the cost for each path is determined based on the local network state of the origination node. If the set of routing paths is empty, the request is rejected (steps 520 and 525). However, if the set of routing paths is not empty, one path from the set is selected in step 530 according to a second criterion. The second criterion is advantageously, as in the method described in FIG. 2, the minimum hop path. However, those skilled in the art will recognize that other criteria (e.g., the least cost path) may be used.

In step 535, the inventive method attempts to route the request on the selected path, i.e., appropriate VC set up protocols will be invoked. In invoking the VC set up protocols, the inventive method may advantageously obtain exact information on the status of link and nodes along the selected path. In short, the inventive method will know, exactly, at what capacity of bandwidth and buffer space the links and nodes along the selected path are operating. The inventive method may then advantageously and optionally update the local network state at the origination node (step 540) and at other nodes along the selected path (step 545).

In step 550, the inventive method checks to see if the routing was successful. Unlike the centralized system of FIG. 2, routing in the method of FIG. 5 is not guaranteed to be successful. This is because the selected path was chosen based on a local network state. Thus, other network resources allocated at other nodes and links may not be reflected in the local network state. Consequently, resources that were expected to be available based on the local state may not, in fact, be available in which case the routing will be unsuccessful. If the routing was successful, the method ends. If the routing was not successful, the counter is incremented in step 555. If the counter has exceed its limit (based on an allowed number of tries in attempting to route the VC), the request is finally rejected. If the counter has not exceeded its limit, the method may then either return to step 515 (via connector 1 in FIG. 5) and find another set of routing paths and continue to execute subsequent steps in the flow chart, or alternatively, the method may goto to step 527 (via connector 1' in FIG. 5). In step 527 a new and different path is selected from the previously determined set of routing paths, and the method then attempts to route on the newly selected path in steps 535–560.

Note that the VC set up protocol may advantageously use an acknowledgement packet to inform the originating node whether or not the circuit was indeed routed and to collect the current state information of each link along the circuit's path. That current state information is used to update the local view of the network at the origination node. If the acknowledgement packet indicated that the circuit was not routed due to insufficient available capacity, the method tries to route the circuit again as if it was a new request.

The method disclosed herein has been described without reference to specific hardware or software. Instead, the method has been described in such a manner that those skilled in the art can readily adapt such hardware and software as may be available or preferable for particular application. Further, to ensure the applicability of the inventive method to a broad range of system environments, the inventive method does not necessarily include any type of periodic state information exchange between nodes although such exchanges can be made and incorporated into the inventive method.

What is claimed is:

1. In a network comprising a set of nodes connected by a set of links, said network characterized by a network state, wherein a set of virtual circuits has been previously routed through said network, a method for operating said network comprising the steps of:

receiving a request to route a virtual circuit on a path through said network between an origination node and a destination node, determining the load on each link in a subset of said set of links in said network due to said request, and determining a respective cost for routing said request over possible paths between said origination and said destination nodes, said cost a function of the network state wherein:

the possible paths comprise links in said subset of said set of links; and the step of determining a routing cost for each possible path comprises:

(a) obtaining a number L which is derived, in part, by counting the links in at least some of the virtual circuits that have already been routed, (b) using L to determine the value of a link-cost parameter $\mu$; and (c) evaluating a respective cost factor for each link of the current path, wherein said cost factor is a function of $\mu$.

2. The method of claim 1 wherein each node in said set of nodes and each link in said set of links has associated resources and further comprising the steps of:

selecting as potential paths in a set of potential routing paths, those possible paths having respective costs below a threshold, and selecting as routing paths in a set of routing paths those potential routing paths comprising nodes and links having sufficient associated resources for routing said request.

3. The method of claim 2 further comprising the step of:

selecting a path from said set of routing paths according to a criterion.

4. The method of claim 3 wherein said criterion is a minimum hop routing criterion.

5. The method of claim 3 wherein said network is a centralized network.

6. The method of claim 3 wherein said request is received at a request processor.

7. The method of claim 3 further comprising the steps of:

routing said request on the selected path, and updating said network state based on the routed selected path.

8. The method of claim 3 wherein said request is received at said origination node, wherein said network state is a local network state at said origination node and wherein said network is a decentralized network.

9. The method of claim 8 further comprising the step of:

determining if sufficient resources are available at nodes and links of the selected path to route said request, wherein the determining is based on local state information at nodes along said selected path.

10. The method of claim 9 further comprising the step of:

updating local state information at said origination node based on local information at nodes along said selected path.

11. The method of claim 9 further comprising the step of:

updating local state information at a node along said selected path based on local information at other nodes along said selected path.

12. The method of claim 9 further comprising the steps of:

routing said request on said selected path if sufficient resources are available, and determining another set of routing paths if sufficient resources are not available.

13. The method of claim 9 further comprising the steps of:

routing said request on said selected path if sufficient resources are available, and selecting a different routing path from said set of routing paths if sufficient resources are not available.

14. The method of claim 1 wherein said request for a virtual circuit is a request for a switched virtual circuit and wherein said request specifies a holding time for the requested virtual circuit.

15. The method of claim 14 wherein said cost function is a function of the holding time for said requested virtual circuit.

16. A method for operating a network of the kind that comprises a set of nodes connected by a set of links, and that in operation can be characterized by a network state, and wherein there are resources associated with each of said nodes and links, the method comprising, after a set of virtual circuits has been previously routed through the network, the steps of:

receiving a request to route a virtual circuit on a path through the network between an origination node and a destination node;

determining the load that fulfillment of the request would place on each link in a subset of the link set; and determining a respective cost for routing the request over possible paths between the origination and destination nodes, wherein:

the possible paths comprise links in the link subset;

the cost is a function of the network state;

for each possible path, the cost includes a component for each link of said path, wherein each said cost component is a nonlinear function of the network state and of a parameter related to the number of hops for a subset of the previously-routed virtual-circuit set; and the method further comprises:

selecting as potential paths in a set of potential routing paths, those possible paths having respective costs below a threshold, and selecting as routing paths in a set of routing paths those potential routing paths comprising nodes and links having sufficient associated resources for routing said request, selecting a path from said set of routing paths according to a criterion, and routing said request on the selected path.

17. The method of claim 16 wherein said criterion is a minimum hop routing criterion.

18. The method of claim 16 further comprising the step of:

updating said network state based on the routed selected path.

19. A method of routing a request for a virtual circuit through a network, comprising:

at an origination node, selecting a path from a set of routing paths, wherein: the selected path comprises nodes and links, the path-selection is carried out in response to a virtual-circuit request, and the path-selection is responsive to incomplete state information;

attempting to route the virtual circuit on at least a portion of the selected path;

while attempting to route the virtual circuit, collecting local state information from a node or nodes on at least one said portion, thereby to evaluate resources available at least at some nodes and links of the selected path; and if sufficient resources are found to be available, completing the routing of the virtual circuit on the selected path.

20. The method of claim 19, further comprising the step of determining another set of routing paths if sufficient resources are not available to route said request.

21. The method of claim 19, further comprising the step of selecting a different routing path from said set of routing paths if sufficient resources are not available to route said request.

22. The method of claim 19, wherein the request for a virtual circuit is first received at an origination node, and the method further comprises the step of sending the collected local state information to the origination node.

23. The method of claim 19 wherein said selected path comprises an origination node and further comprising the step of:

updating local state information at said origination node along said selected path.

24. The method of claim 23 wherein said network is a decentralized network.

* * * * *